Feb. 23, 1960  J. R. MILES  2,925,751
SYMMETRICAL OPTICAL SYSTEM FOR BINOCULAR VIEWING DEVICES
Filed Aug. 9, 1954  2 Sheets-Sheet 1

INVENTOR.
John R. Miles,
BY Wilkinson Huxley
Byron & Hume
Attys

Feb. 23, 1960   J. R. MILES   2,925,751
SYMMETRICAL OPTICAL SYSTEM FOR BINOCULAR VIEWING DEVICES
Filed Aug. 9, 1954   2 Sheets-Sheet 2

INVENTOR.
John R. Miles,
BY Wilkinson, Huxley,
Byron & Hume
ATTYS

United States Patent Office 2,925,751
Patented Feb. 23, 1960

2,925,751

SYMMETRICAL OPTICAL SYSTEM FOR BINOCULAR VIEWING DEVICES

John R. Miles, Chicago, Ill., assignor, by mesne assignments, to Chicago Aerial Industries, Inc., Melrose Park, Ill., a corporation of Delaware Application August 9, 1954, Serial No. 448,521

2 Claims. (Cl. 88—1)

The present invention relates to optical systems, and, more particularly, to optical systems for binocular viewing devices.

Heretofore, in the manufacture of binocular viewing devices with double exit pupils and a single entrance pupil, two eyepieces have been used, or when a single eyepiece or eye lens has been used, an optical system has been employed which required inclined or angularly displaced lens axes. The necessity for these angularly displaced lens axes in such a system is due generally to the convergence or inward turning of the eyes of the observer. This convergence of the eyes sets up two optical axes with a moderate angle between them, which axes cross at or near the eye lens. These two optical axes, in such a system, also intersect two objective lenses or erectors on the side of the eye lens opposite to the eyes. In addition the two optical axes pass into a beamsplitting device, or the like, which brings the two axes into coincidence so that they become a single entrance axis of a single extrance lens system.

In the single entrance pupil, double exit pupil optical systems which have been used heretofore, the optical axis of the single entrance lens system has been at an angle of inclination to the axis of the eye lens, due also in part to the type of beamsplitter heretofore employed. This angle of inclination, combined in some cases with the displacement to the side of the single optical axis, has caused difficulties in the manufacture of such binocular viewing devices. It has usually been necessary to bring the single optical axis not only back to parallelism with the eye lens axis, but also to bring it back to lie in the plane which is a perpendicular bisector of the line joining the eyes of the observer. This central plane has usually been a central vertical plane of symmetry of the completed binocular viewing device.

Another defect of binocular viewing devices having a single entrance pupil and a double exit pupil, as previously constructed, has been the undesirable rotation or twist of the final image which is introduced. This rotation, or twist of the final image, has been produced in previous instruments in order to remove the small angle involved in the angular inclination, by twisting one, or more, of the reflecting surfaces in the lower part of the binocular viewing devices. This rotation must either be tolerated or compensated for by some complex means, which itself introduces additional defects such as additional loss of light or aperture. In the event that wedge prisms are used to overcome this small angle of inclination, for example, color aberrations are introduced, which are difficult to eliminate.

One of the objects of the present invention is to provide a novel optical system for binocular viewing devices, in which the two optical axes entering the observer's eyes for binocular vision emerge from the back of the beamsplitting device symmetrically with respect to the entering single optical axis.

Another object of the present invention is to provide a novel binocular viewing device which has almost complete symmetry of construction.

Another object of the present invention is to provide a novel binocular viewing device having a beamsplitting device with its two exiting apertures separated by less than 50 percent of the diameter of said exiting apertures, so that the exit apertures of the beamsplitting device will be sufficiently large in relation to the separation thereof as to permit freedom of lateral head movement for the observer, equal to approximately .7 or at least approximately .6 of the separation of an average observer's eyes. The magnitude of this lateral head movement is directly related to the relation of the sizes of the exit apertures of the beamsplitting device, and the separation of the said exit apertures. These are directly related because the centers of the said exit apertures are proportionally imaged at the location of the observer's eyes by an eye lens or field lens, and furthermore, at the observer's eyes, the images of the two exit apertures must have a center to center separation equal to the separation of the observer's eyes. Thus, if the diameter of these beamsplitter exit apertures is equal to .6 of their center to center separation, the lateral head movement would be equal to .6 of the center to center separation of the observer's eyes, or: .6 times 2.5 inches equals 1.5 inches lateral head movement. It has been found that this 1.5 inch is a practical lower limit to the lateral head movement for binocular viewing devices, with a single eye lens.

Beamsplitting devices with a construction such that all the reflections involved are 90 degree reflections have been previously employed in double exit pupil, single entrance pupil, binocular viewing devices such as binocular microscopes, with two eyepieces and one objective. These previous beamsplitting devices, however, have normally been manufactured in such a way that the size of the two exit apertures could not exceed .5 of the center separation of the two exit apertures. If these previous beamsplitting devices were used in a binocular viewing device with a single entrance pupil and double exit pupils, together with a single eye lens, and the system were symmetrical, the resulting size of the exit apertures would be further decreased. It would be considerably less than 1.25 inches when imaged at the eyes of the observer, which would produce a 1.25 inch maximum head movement, and this 1.25 inch head movement is not sufficient in most cases of this type.

In previous optical devices, lens means have been provided for bringing about convergence of optical axes in a manner apparently similar to the method employed in the present invention. Heretofore, however, these lens means have not been combined in the novel manner of the present invention, nor have such lens means been combined with any beamsplitting device of the novel character of that of the present invention. Accordingly, another object of the present invention is to provide a novel combination of lens means and beamsplitting means in which a separation of the two exiting axes is produced by a novel beamsplitting device, and the tilting of the two exiting axes, necessary because of the convergence o fthe observer's eyes, is produced by a novelly combined lens means.

The above and other objects and advantages of the present invention will appear more fully hereinafter from a consideration of the detailed description and claims which follow, taken together with the accompanying drawings, wherein one embodiment of the invention is illustrated. It is to be expressly understood, however, that the drawings are for the purpose of illustration only, and are not designed as a definition of the limits of the invention. Reference for this latter purpose should be had to the appended claims.

In the drawings, wherein like reference characters refer to like parts throughout the several views.

Figure 4:
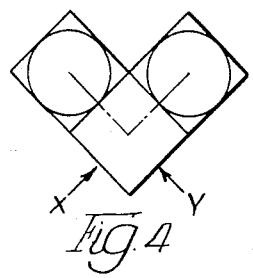
Figure 4 shows an end view of the novel beamsplitting device employed in the embodiment of the applicant's invention shown in Figure 3, the view being taken along the line 4—4 of Figure 3 in the direction of the arrows.
Figure 6:
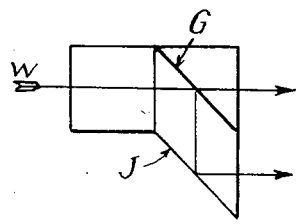

Figure 6 shows a side view of the said novel beamsplitting device, as viewed from direction Y, as defined in Figure 4. G represents a reflecting surface inclined at least approximately at 45 degrees to the incoming axis W, and J represents a reflecting surface at least approximately parallel to surface G. Surface G is arranged in relation to surface D in such a way that G reflects the incoming axis W in a direction approximately perpendicular to the direction in which D reflects incoming axis W.

Figure 2:
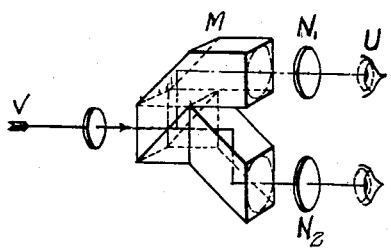
Figure 2 shows prior art in the form of an approximately symmetrical binocular viewing device in which the diameter of the exit apertures of the beamsplitting device are about equal to one-half the center to center separation of the exit apertures.
Figure 7:
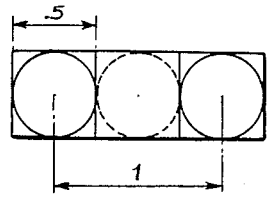

Figure 7 shows a rear view of the prior art beamsplitting device shown in Figure 2, and Figure 7 also shows the .5 to 1 relation of the exit aperture of this prior art beamsplitting device to the center to center separation of its exit apertures.

Figure 8:
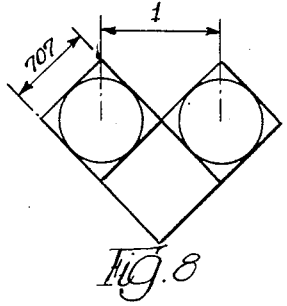

Figure 8 shows an additional rear view of the applicant's novel beamsplitting device, and the approximate .7 to 1 relation of diameter of its exit apertures to their center to center separation.

Figure 3:
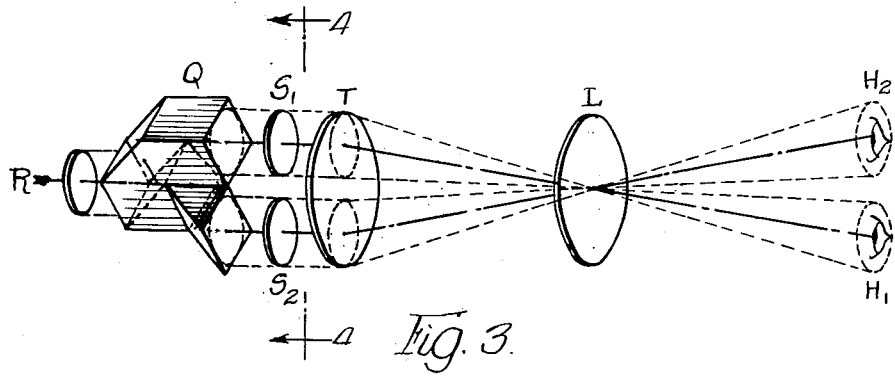
Figure 3 shows a schematic plan view from above of one embodiment of the present invention.
Figure 9:
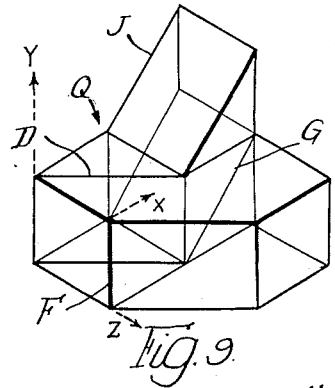

Figure 9 is a perspective view of the beamsplitting device shown in Figure 3.

Figure 10:
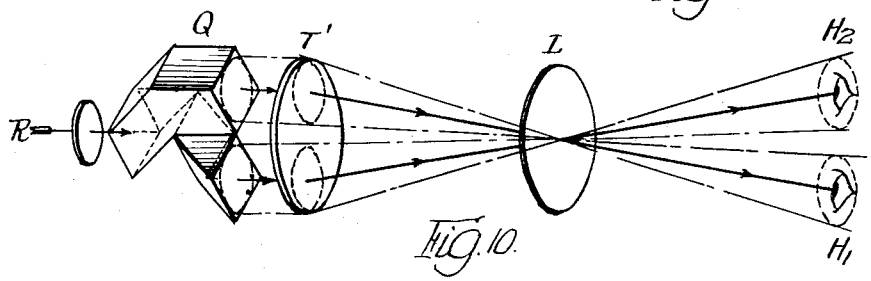

Figure 10 is a schematic view of an alternative embodiment of the invention.

Figure 1:
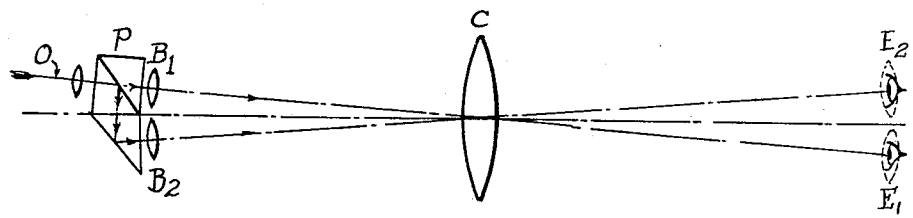
Figure 1 shows prior art in the form of an unsymmetrical binocular viewing device with a single entrance pupil and two exit pupils.

Referring to the drawings for a more detailed description of the present invention, in the prior art construction shown in Figure 1, the letter O represents the entrance axis which is inclined and non-centrally located. P represents the beamsplitting means while $B_1$ and $B_2$ represent the two objective lenses or erectors having inclined axes and being disposed on the side of the eye lens opposite to the eyes. C represents the eye lens while $E_1$ and $E_2$ represent the positions of the two exit pupils which are images of the apertures of lens $B_1$ and $B_2$ formed by eye lens C.

In the prior art construction of Figure 2, the letter V represents the entrance axis while the letter M represents the beamsplitting device of this binocular viewing device, and $N_1$ and $N_2$ represent the two eye lenses used in this type of system. The two exit pupils at U are small, and the lateral eye freedom necessarily small also, usually being about 1/3 of an inch, or less.

In Figure 3, which shows one embodiment of the present invention, R represents the single entrance axis which is centrally located. Q represents the beamsplitting device in this embodiment. $S_1$ and $S_2$ represent two objective lenses or erectors which may be disposed on the side of the eye lens that is opposite to the eyes. T represents a long focal length converging lens adapted to converge the two lines that pass through the centers, or axes, of lenses $S_1$ and $S_2$ so that the said two lines cross at the center of eye lens L and then intersect the eyes of the observer at the centers of exit pupils $H_1$ and $H_2$ which are images of $S_1$ and $S_2$ formed by eye lens L.

In the embodiment shown in Figure 3, all lens axes are substantially parallel.

Figure 5:
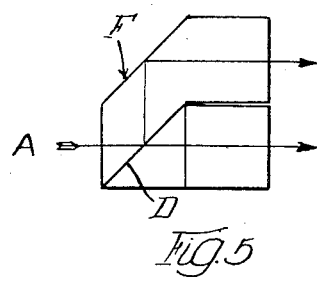
Figure 5 shows a side view of the said novel beamsplitting device, as viewed from direction X, as defined in Figure 4, in which D represents the semi-reflecting beamsplitting surface inclined at least approximately at 45 degrees to the incoming axis, and F a substantially totally reflecting surface, at least approximately parallel to surface D.

The configuration of the beamsplitting device Q is additionally shown in Figures 4, 5, 6 and 9. For purposes of clarity the direction in which the view shown in Figure 5 is taken is shown by the arrow X in Figure 4. Similarly the direction in which the view shown in Figure 6 is taken is shown by the arrow Y in Figure 4. In Figure 5, letter F represents the reflector which is parallel to the partial reflecting and partial transmitting reflector D while letter A represents the entering beam.

In Figure 6, letters G and J represent the two parallel non-transmitting reflectors, which are perpendicular to a plane, which plane is inclined at 45 degrees to the partial reflecting, partial transmitting reflector D of Figure 5. W of Figure 6 represents the entering beam which is the same entering beam represented by A of Figure 5, and, consequently, the same entering beam represented by R in Figure 3.

Figure 7 and Figure 8 show that the present invention improves the ratio of pupil to pupil separation from .5:1 to .7:1. As previously stated, this results in an improved freedom of lateral head movement for the observer, which is a particularly important factor in some of the uses to which this type of device may be put, such as in military aircraft.

The embodiment shown in these figures provides a novel arrangement of prisms and lenses which produce a binocular viewing device with a single entrance system, and single entrance pupil, together with two exit pupils and a single viewing lens or eye lens, characterized in that (1) all the lens axes therein are substantially parallel, (2) the prisms therein have all their reflecting faces arranged at angles of 45 degrees, or multiples of 45 degrees, to other faces of said prisms, and (3) the exit pupils are symmetrically arranged in relation to the entrance axis of the entrance optical system.

By comparing Figures 2 and 3 it may be seen that the present invention also provides in this embodiment a novel beamsplitting means composed of a beamsplitting cube which has the equivalent of one 45 degree reflecting prism, and one solid cube on the side on which the split reflection takes place, and the equivalent of a doubly reflecting rhombic prism on the face opposite the entrance face, but with the rhombic prism, or the like, turned at 90 degrees so that the two exit faces of the complete combination are adjacent corner to corner.

The present invention additionally provides this novel beamsplitting device in combination with a long focal length lens T as shown in Figure 3, so that the parallel lines passing through the centers of $S_1$ and $S_2$ emerging from the beamsplitting device are thereby converged to intersect at or near the eye lens, or field lens unit, L, so that these lines will proceed to intersect the observer's eyes at $H_1$ and $H_2$ as shown in Figure 3.

In this embodiment of the present invention, erector lens units $S_1$ and $S_2$ are provided adjacent to the exit surfaces of the beamsplitter, so that they, in conjunction with the converging lens T, image the original object at or near eye lens L. The lens L functions as a field lens to collect the principal light rays and to direct them into the eye and, inasmuch as it is the lens closest to the viewing eye, the lens is called, according to the conventional language of optics, the eye lens of the system. The observer's eyes at $H_1$ and $H_2$ of Figure 3 can thus comfortably both converge and focus on the image formed at or near eye lens unit L of Figure 3. However, lens units $S_1$ and $S_2$ may in other embodiments of the present invention be combined and included in lens T as shown in Figure 10.

Prior constructions of binocular viewing devices with singular entrance pupils and two exit pupils have had either detrimental, unsymmetrical construction, or disadvantageous proportions, so that the sizes of the exit pupils have been limited. On the other hand, the present invention provides a symmetrical construction which produces a more compact design and eliminates by its symmetry any tilt or twist of the image, which tilt or twist was difficult to eliminate in prior unsymmetrical constructions. Likewise, the present invention provides larger size exit pupils, which larger size exit pupils make possible a greater lateral head movement. The end result is a binocular viewing device of simplified and less expensive construction which at the same time provides better performance.

In the drawings and specification, there has been set forth several preferred embodiments of the invention, and although specific terms are employed, they are used in a generic and descriptive sense only and not for purposes of limitation. Changes in form and in the proportion of parts, as well as the substitution of equivalents are contemplated, as circumstances may suggest or render expedient, without departing from the spirit or scope of this invention as further defined in the following claims.

What is claimed is:

1. A binocular optical system for use in a binocular viewing device comprising a single entrance lens unit, a beam splitting means adjacent said entrance lens unit for receiving beams of light transmitted therethrough and for dividing said received beams of light into two exit beams of light wherein the paths of travel of said two exit beams in said beam splitting means are of equal length and the two axes of said two exit beams after proceeding from said beam splitting means are parallel, a corresponding pair of objective lenses positioned adjacent to the exit surfaces of said beam splitting means with their axes coincident with the two axes of said two exit beams for further transmitting said two exit beams in the direction of said two axes and for inverting the images formed thereby, an axis converging lens unit adjacent said pair of objective lens in the path of said two transmitted exit beams for symmetrically converging the two axes of said two exit beams of light to form superimposed images at the focal point thereof, and a single field lens unit positioned in the path of said converging axes at a distance from said converging lens unit substantially equal to the focal length thereof in order thereby to define two exit pupils for the system, whereby eyes of an observer positioned at said exit pupils can both converge and focus on the superimposed images formed at or near the field lens unit.

2. A binocular optical system for use in a binocular viewing device comprising a single entrance lens unit; a beamsplitter assembly including four reflector surfaces arranged in a closely spaced apart relationship, a first one of said reflector surfaces being partially reflecting and partially transmitting and being positioned to intercept the beams of light transmitted through the entrance lens unit at an angle of substantially 45° to the axis of said entrance beams of light thereby to split the beams of light into reflected first beams of light and transmitted second beams of light, a second one of said reflectors being a total reflector and being disposed substantially parallel to said first reflector to further reflect said first beams of light, and the remaining third and fourth ones of said reflectors being total reflectors and being disposed substantially parallel to each other and to a plane which is inclined at substantially 45° to said first reflector to reflect said second beams of light, said beamsplitter being arranged so that the paths of travel of said first beams of light and said second beams of light therethrough are of equal length, whereby the two axes of the two exit beams of light from the beamsplitter formed by said first and second beams of light are parallel to each other and to the axis of said entrance beams of light and are equally spaced from said last-named axis in a plane displaced therefrom; a corresponding pair of objective lenses positioned adjacent to the exit surfaces of said beamsplitting assembly with their axes coincident with the two axes of said two exit beams for further transmitting said two exit beams in the direction of said two axes and for inverting the images formed thereby; an axis converging lens unit adjacent said pair of objective lens in the path of said two transmitted exit beams for symmetrically converging the two axes of said two exit beams of light to form superimposed images at the focal point thereof; and a single field lens unit positioned in the path of said converging axes at said focal point in order thereby to define two exit pupils for the system, whereby eyes of an observer positioned at said exit pupils can both converge and focus on the superimposed images formed at or near the field lens unit.

References Cited in the file of this patent

UNITED STATES PATENTS

| | | |
|---|---|---|
| 1,114,232 | Cheron | Oct. 20, 1914 |
| 2,189,298 | Rantsch | Feb. 6, 1940 |
| 2,389,646 | Sleeper | Nov. 27, 1945 |
| 2,391,675 | Brown | Dec. 25, 1945 |
| 2,658,422 | Miles | Nov. 10, 1953 |
| 2,674,919 | Rodriguez | Apr. 13, 1954 |

FOREIGN PATENTS

| | | |
|---|---|---|
| 153,325 | Great Britain | Nov. 3, 1920 |
| 75,725 | Sweden | Dec. 12, 1928 |
| 817,698 | France | May 31, 1937 |
| 1,028,749 | France | Feb. 25, 1953 |